United States Patent [19]

Datta

[11] 4,076,991
[45] Feb. 28, 1978

[54] SEALING MATERIALS FOR CERAMIC ENVELOPES

[75] Inventor: Ranajit K. Datta, Cleveland Heights, Ohio

[73] Assignee: General Electric Company, Schenectady, N.Y.

[21] Appl. No.: 794,398

[22] Filed: May 6, 1977

[51] Int. Cl.² ...................... H01J 61/36; C04B 35/50
[52] U.S. Cl. ................................... 313/220; 313/221; 313/227; 106/73.2; 428/433
[58] Field of Search .................. 313/220, 221, 227; 428/433; 106/73.2, 39.6

[56]  References Cited
U.S. PATENT DOCUMENTS

| | | | |
|---|---|---|---|
| 3,281,309 | 10/1966 | Ross | 428/433 |
| 3,441,421 | 4/1969 | Sarver et al. | 313/220 X |
| 3,588,573 | 6/1971 | Chen et al. | 313/221 |
| 3,848,151 | 11/1974 | McVey | 313/220 X |

Primary Examiner—Palmer C. Demeo
Attorney, Agent, or Firm—Ernest W. Legree; Lawrence R. Kempton; Frank L. Neuhauser

[57]  ABSTRACT

New sealant compositions for sealing end closures or inleads in ceramic envelopes are based on the system $Dy_2O_3$-$Al_2O_3$-$SiO_2$. These compositions will withstand metal halides used as arc materials up to temperatures exceeding 1200° C, and make possible more efficient lamps of improved color rendition.

9 Claims, 2 Drawing Figures

SEALING MATERIALS FOR CERAMIC ENVELOPES

The invention relates to new sealing materials for the ceramic envelopes of high temperature lamps and discharge devices.

BACKGROUND OF THE INVENTION

Ordinary glasses (limesilicate or borosilicate) have been used as container materials for lamps and vacuum tubes. However, with increasingly more complex design of improved lamps types, other container materials with ability to withstand higher temperatues and corrosive chemical atmospheres are constantly being sought. Because of their impervious nature, high mechanical strength, good thermal and electrical insulating properties, high permeability to visible radiation, etc., fused silica and alumina — the latter in densely sintered polycrystalline, translucent form, or in the form of monocrystalline alumina or synthetic sapphire — are increasingly used as discharge vessel (arc tube) for high intensity discharge lamps and as containers for vacuum tubes.

In many high intensity discharge lamps, halides of one or more elements are added to the gas fillings to enhance the light output and to improve the color rendition as taught in U.S. Pat. No. 3,234,421 — Reiling. In the case of fused-silica arc tubes, a vacuum-tight condition is achieved by pinch-sealing the two ends of the tube at a temperature of about 1600° C with inleads of refractory metal extending through the sealed ends. The use of fused silica arc tubes for such discharge lamps, however, imposes certain constraints. Thus, several halides react with fused silica at the lamp-operating temperature resulting in leakage and ultimate lamp failure. In addition, part of the halide is removed from the discharge atmosphere through such reactions, causing a reduction in the contribution of the halide to the radiation emission. Halides which cannot be used in combination with fused silica are, for example, cadmium iodide, aluminum iodide, dysprosium iodide, and several other chlorides and bromides. Furthermore, the maximum permissible operating temperature of lamps with fused silica arc tube is around 900° C. Many halides with potential for enhanced color rendition have vapor pressures too low at this temperature to be effective as arc material in fused-silica arc tubes, for example: dysprosium iodide, cerium iodide, etc.

One way to overcome the preceding problems is by selecting a discharge-vessel material which can operate at a higher temperature and resists chemical attacks by more reactive halides. A promising material is alumina in densely sintered polycrystalline form or in the form of sapphire. Alumina readily withstands a temperature of 1300° C, and it is chemically resistant to many halides. Alumina arc tubes are currently used in sodium vapor discharge lamps wherein the lamp operating temperature is around 850° C. Electrical current is supplied to the electrodes through inleads passing through ceramic plugs in the tube ends or through metal (niobium, tantalum, molybdenum, etc.) end caps. In either case the end closure assemblies are cemented to the alumina tube by means of sealing glass with composition based on the system $CaO-MgO-Al_2O_3$ (U.S. Pat. No. 3,281,309 — Ross) or on the system $CaO-BaO-MgO-Al_2O_3$ (U.S. Pat. No. 3,441,421 — Sarver).

In newer designs of high intensity discharge lamps now being considered, operating temperatures considerably higher than 850° C are envisaged. For example, arc lamps using alumina ceramic envelopes and a fill including rare-earth halides as described in U.S. Pat. No. 3,334,261 — Butler et al., have enhanced light output coupled with improved color rendition provided the lamp operating temperature is pushed up to around 1200° C or above. Known seal glasses based on the system $CaO-MgO-Al_2O_3$ or $CaO-BaO-MgO-Al_2O_3$ soften at this temperature leading to leakage and ultimate lamp failure. In addition, several metallic halides, such as scandium iodide, dysprosium iodide, yttrium iodide, etc., with good promise as arc material components react with alkaline-earth oxides of the seal glass or with niobium metal of the inleads or of the end cap. This results in the sealed joint being no longer vacuum-tight, and the lamp fails due to leakage. Also, such reactions tie up halides from the discharge atmosphere and at the same time, introduce elements from the seal glass into the discharge material, causing a deviation from the designed radiation emission.

In U.S. Pat. No. 3,588,573 — Chen et al., the thermodynamic basis for predicting reactions between the arc materials and the seal glass is outlined and a set of seal glass compositions based on the systems $R_2O_3-Al_2O_3$ (R = Rare-earth) is suggested. The proposed seal glasses are chemically compatible with the halides in the discharge atmosphere. However, they melt only at exceedingly high temperature (around 1800° C) and this means that the ends of the arc tube must be subjected to such temperatures during the sealing operation. This introduces manufacturing difficulties and causes thermal stress and mechanical tension in the seal joint area upon cooling after the sealing operation, leading to a high rate of rejects and high costs.

The object of this invention is to provide sealing glass compositions for use with high intensity ceramic discharge lamps wherein the foregoing dificulties are either eliminated, or at least minimized.

SUMMARY OF THE INVENTION

The present invention provides a new set of seal glass compositions for sealing alumina arc tubes of high intensity discharge lamps with refractory-metal end caps or with discs or plugs or ceramic materials including alumina, or for sealing refractory metal inleads through ceramic. The guidelines for selection and ultimate formulation of the new glass system are:

i. Chemical compatibility between the seal glass and other lamp components, such as sintered alumina, arc materials (metal halides, mercury, etc.).

ii. Thermal compatibility, i.e. matching coefficient of linear thermal expansion between seal glass, sintered alumina, arc tubes, discs, plugs, refractory metals, etc. A linear coefficient of expansion of around $90 \times 10^{-7}/°$ C at 850° C is considered appropriate.

iii. Low vapor pressure glass to minimize contamination of the arc atmosphere.

iv. Good bond between the sealed components assuring a vacuum-tight seal of good mechanical strength.

v. Seal glass compositions melting at around 1500° C with good wetting properties to minimize manufacturing difficulties during sealing operation.

vi. Glass compositions with softening point above 1300° C to insure firm seal of good mechanical strength maintaining vacuum-tight nature during lamp operation.

I have found a set of sealing compositions based on the system $Dy_2O_3$-$Al_2O_3$-$SiO_2$ which satisfy the above criteria. They permit the design of discharge lamps with envelopes comprising essentially alumina and containing at least one halide as an arc material and operating at temperatures up to about 1200° C.

DETAILED DESCRIPTION

Figure 1:
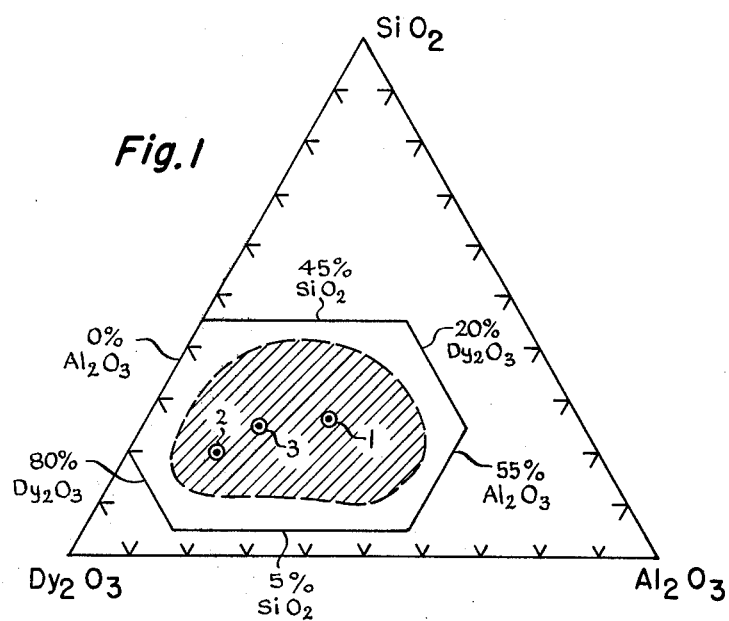
FIG. 1 is a phase diagram for the system $Dy_2O_3$-$Al_2O_3$-$SiO_2$ on which the invention is predicated.

The sealing compositions of this invention are based on the ternary system $Dy_2O_3$-$Al_2O_3$-$SiO_2$. Their characterizing composition comprises 20–80% by weight of $Dy_2O_3$, 0–55% by weight of $Al_2O_3$ and 5–45% by weight of $SiO_2$; the hexagonal figure in FIG. 1 corresponds to these limits. The cross-hatched area represents the glass forming compositions of the system at 1450° C; at higher temperature, the area comprising glass forming composition widens. Outside the indicated composition limits, seals can be made only with difficulty and with large mechanical tension in the sealing joints upon cooling.

Thermodynamic calculations and experiments show that these glasses are chemically compatible with sodium vapor and rare-earth halides, such as $DyI_3$, $NdI_3$, $LaI_3$, $ScI_3$, etc. proposed as arc materials in high intensity discharge lamps using alumina arc tubes at higher temperatures for improved color rendition and enhanced luminous efficiency. Simulated lamp tests indicate no chemical reaction between these halides and seal glass. In addition, during the simulated lamp tests, the sealed joint between the alumina arc tube and the alumina end plug or disc maintained its vacuum-tight nature.

To minimize mechanical tension in the sealed joint area, it is imperative that the seal glass have an expansion coefficient similar to the alumina arc tube and end caps, and to the chosen metal. The mean coefficient of linear thermal expansion in the temperature range 200°–800° C of several of the compositions of the sealant system disclosed here is $76$–$82 \times 10^{-7}/°$ C. The instantaneous coefficient of linear thermal expansion for some of the compositions at 850° C is about $93 \times 10^{-7}/°$ C. In general, the expansion coefficient increases with $Dy_2O_3$ and $Al_2O_3$ content, but decreases with $SiO_2$ content of the sealant. The variability of expansion coefficient with composition makes the seal glass more versatile. Thus, the sealing composition can be varied to permit sealing to non-alumina ceramic bodies as well. In other applications where a ceramic-to-ceramic or ceramic-to-refractory metal seal is required, this seal glass can be used with appropriate variations in the composition to achieve the particular coefficient of expansion needed. In addition, further variations in melting point, chemical compatibility, coefficient of expansion, etc., can be achieved by replacing a part of $Dy_2O_3$ by other rare-earth oxides, such as $Y_2O_3$, $Nd_2O_3$, etc. Photomicrographs of sectioned ends of alumina-to-alumina or alumina-to-refractory metal seals show interlocking crystals of size as large as several microns. This indicates a good bond between the sealed parts and assures the vacuum-tight nature of the seal.

It is undesirable to heat the alumina/alumina or alumina/refractory metal joints above 1600° C during the sealing operation. The sealant compositions disclosed in this invention have liquidus temperatures around 1450° C, permitting seal manufacture at temperatures around 1500° C. Heating to this temperature will not introduce any appreciable thermal stress and mechanical tension in the seal joint area upon cooling after the sealing operation.

The sealing compositions of the present invention can be prepared by mechanically mixing the fine-grained oxide powders in appropriate proportions. Ball-milling during mixing is recommended as the process will grind the materials to a finer state and enhance homogenization. The mixture, contained in a platinum crucible, is heated at 1300° C in air atmosphere for several hours. The heating process should be repeated several times until the solid-state reaction is complete and equilibration achieved. This can be monitored by X-ray diffraction analysis of the sample following each heating cycle.

The pre-reacted material may be mixed with an organic binder and made into a washer or wafer of appropriate size which is then placed between the two parts to be sealed. The parts are heated to 1500° C and then cooled at a predetermined rate. Alternatively, the pre-reacted material can be made into a suspension which is applied with a brush on the common surfaces of the mating parts, dried, heated to 1500° C and cooled following an appropriately programmed cycle.

Figure 2:
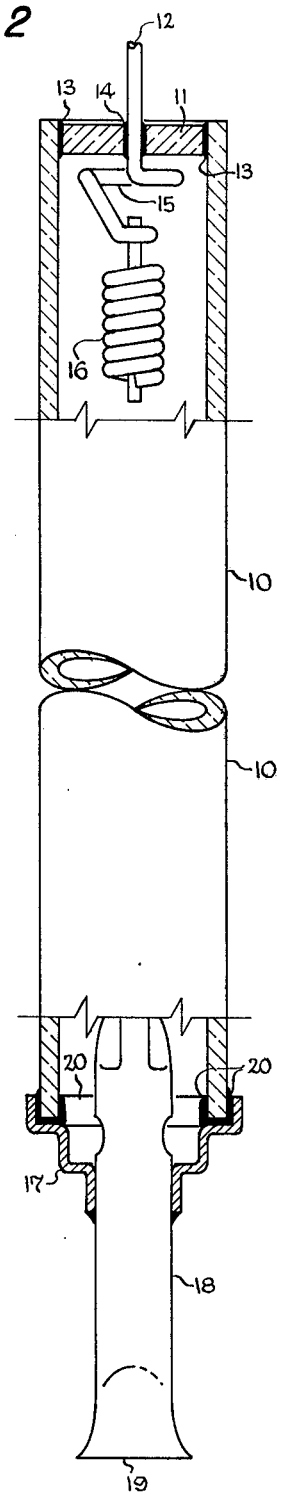
FIG. 2 shows a high temperature metal vapor lamp arc tube illustrative of the use of the sealing compositions of this invention.

A principal use of the sealing compositions of this invention is in sealing end plugs or caps or inleads in ceramic lamps of the type illustrated in FIG. 2. The lamp comprises a ceramic envelope or tube 10 made of densely sintered polycrystalline alumina. The upper end is closed off by a centrally perforated plug 11 of alumina ceramic through which extends a refractory metal inlead wire 12. The plug is hermetically sealed into the end of the tube by a ring of the sealing composition of the invention indicated at 13. Refractory metal inlead wire 12 is sealed at the hole through the plug by some of the same sealing composition indicated at 14. The inlead curves into a ring-like loop 15 to provide thermal isolation between electrode 16 attached to its end and the seal through the plug. The electrode comprises tungsten wire coiled in two layers around a tungsten shank.

The closure at the lower end of the ceramic tube illustrates a different kind comprising a metal end cap 17 through which an axial metal tube 18 extends immediately. Tube 18 serves as an exhaust and fill tubulation during manufacture of the lamp. It is sealed off at its outer end 19 and serves as a reservoir for excess unvaporized arc material during lamp operation. The end cap is sealed to the alumina tube 10 by a ring 20 of the sealing composition of the invention located between the flange of the cap and the wall of the tube. The inlead 12 in plug 11 and the end cap 17 are preferably made of a metal which is a reasonably close match in expansion for the ceramic tube 10, for instance niobium or tantalum where the ceramic is alumina. Molybdenum or even tungsten inleads or end caps may be used when necessary to withstand the attack of the metal halides selected for the fill; they should be of thin material in order to yield without overly stressing the ceramic, and inleads may be thin-walled tubes. This is desirable because the coefficients of thermal expansion of molybdenum and tungsten are not as close a match to that of alumina ceramic as is niobium.

The following are examples of specific seal glasses embodying the invention that have been made and tested.

EXAMPLE 1

A seal glass containing about 42.5% by wt. $Dy_2O_3$, 31% by wt. $Al_2O_3$, and 26.5% by wt. $SiO_2$ (point 1 in FIG. 1), was used in making a vacuum-tight butt seal between ⅜ inch outside diameter polycrystalline alumina arc tubing and 0.125 inch thick end discs of the same material at 1500° C. The prepared lamp contained sodium and mercury vapor and operated at 400 watts for in excess of 100 hours. No leakage was detected and photomicrographs of sectioned seals showed interlocking, fine-grained, recrystallized structure.

EXAMPLE 2

A polycrystalline alumina arc tube of ⅜ inch outside diameter was sealed to a 0.125 inch disc of the same material using a sealant with 65% by wt. $Dy_2O_3$, 15% by wt. $Al_2O_3$ and 20% by wt. $SiO_2$ (point 2 in FIG. 1) at 1500° C. The entire seal was sawed off the tube and put inside a fused silica tube along with 15 mg of mercury, 2 mg of dysprosium iodide, and 2 mg of mercury iodide. The fused silica tube was then filled with argon up to a pressure of 20 torr and sealed off. The entire tube was then heated to 900° C for about 16 hours, cut open and the sealed joint sectioned and examined under a binocular microscope. No chemical reaction between the seal and the iodide could be observed.

EXAMPLE 3

A seal was prepared as described in Example 2, but using a sealant with 55% by wt. $Dy_2O_3$, 20% by wt. $Al_2O_3$, and 25% by wt. $SiO_2$ (point 3 in FIG. 1). The sawed off seal was put inside a fused silica arc tube containing 15 mg of mercury, 0.4 mg of indium, 2 mg of mercury iodide, 2 mg of thallium iodide, 30 mg of sodium iodide and sealed off under a 20 torr pressure of argon. The entire tube was heated to 900° C for about 16 hours, cut open and the sectioned sealed joint examined under a binocular microscope. No chemical reaction could be observed.

My invention has greatly broadened the choide of materials which may be used as arc materials in ceramic discharge lamps or devices. Besides ordinary arc metals like mercury and sodium, many metal halides may now be used and at higher temperatures than formerly. The sealing compositions of my invention may of course be used to seal end closures and inleads of substantially different configurations than those that have been illustrated.

What I claim as new and desire to secure by Letters Patent of the United States is:

1. A sealing composition for sealing to ceramics comprising reacted material characterized by proportions of 20–80% by weight $Dy_2O_3$, 0–55% by weight $Al_2O_3$ and 5–45% by weight $SiO_2$.

2. A sealing composition as defined in claim 1 wherein part of the proportion of $Dy_2O_3$ is replaced by $Y_2O_3$, $Eu_2O_3$, $Gd_2O_3$ or mixtures thereof.

3. A sealing composition for sealing alumina, niobium, tantalum, molybdenum of tungsten end closures or inleads to an alumina envelope comprising reacted material characterized by proportions of 20–80% by weight $Dy_2O_3$, 0–55% by weight $Al_2O_3$ and 5–45% by weight $SiO_2$.

4. A sealing composition as defined in claim 3 wherein part of the proportion of $Dy_2O_3$ is replaced by $Y_2O_3$, $Eu_2O_3$, $Gd_2O_3$ or mixtures thereof.

5. An electric discharge device comprising:
a generally tubular envelope, of alumina ceramic, closure members in the ends of said envelope,
electrodes within said envelope supported by said closure members and having external connections therethrough,
and a sealing composition hermetically bonding said closure members to said ceramic envelope, said sealing composition comprising reacted material characterized by proportions of 20–80% by weight $Dy_2O_3$, 0–55% by weight $Al_2O_3$ and 5–45% by weight $SiO_2$.

6. A device as defined in claim 5 containing a filling of arc materials including at least one metal halide.

7. A device as defined in claim 5 wherein one closure member is an alumina plug having an aperture through which an inlead extends to which the electrode is fastened,
said inlead being hermetically sealed to said plug by said sealing composition.

8. A device as defined in claim 5 wherein one closure member is a metal end cap to which the electrode is fastened.

9. A device as defined in claim 5 wherein part of proportion of $Dy_2O_3$ is replaced by $Y_2O_3$, $Eu_2O_3$ or $Gd_2O_3$ or mixtures thereof.

* * * * *